A. O. SLENTZ.
POWER SLIP JOINT FORMING MACHINE.
APPLICATION FILED JULY 17, 1914.
1,121,675.
Patented Dec. 22, 1914.
5 SHEETS—SHEET 3.
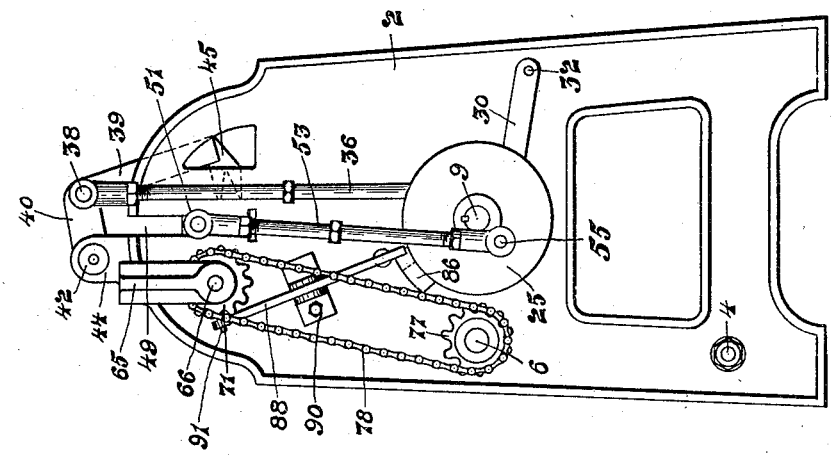
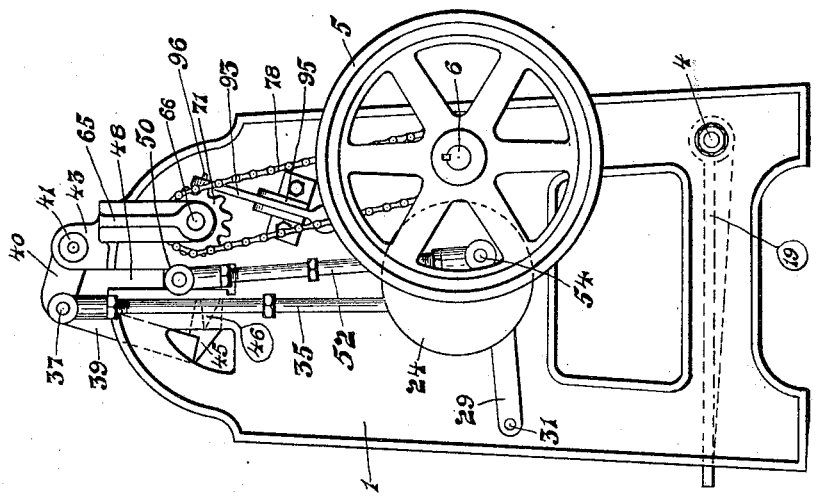
Witnesses
Robert Karcher
J. H. Bishop
Inventor
Albertus O. Slentz
By H. H. Bond
Attorney

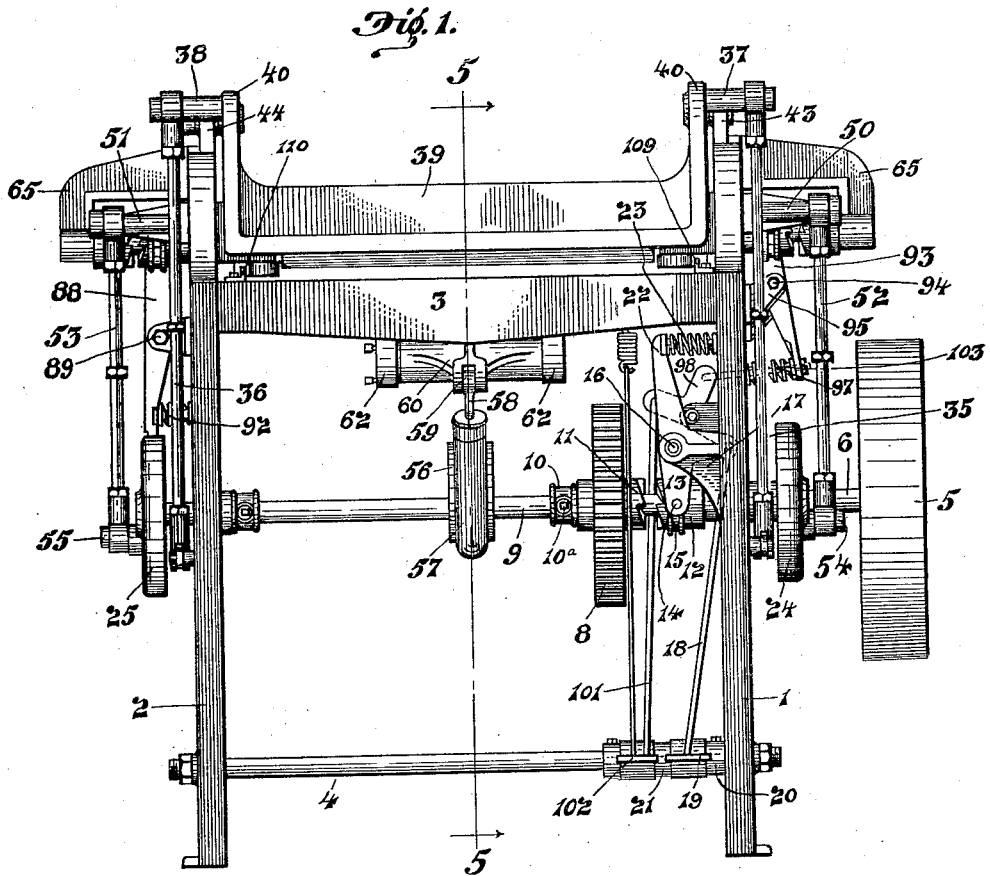
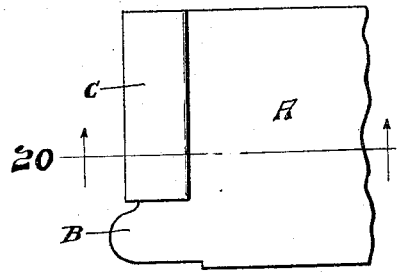
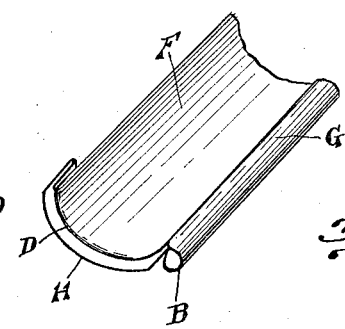

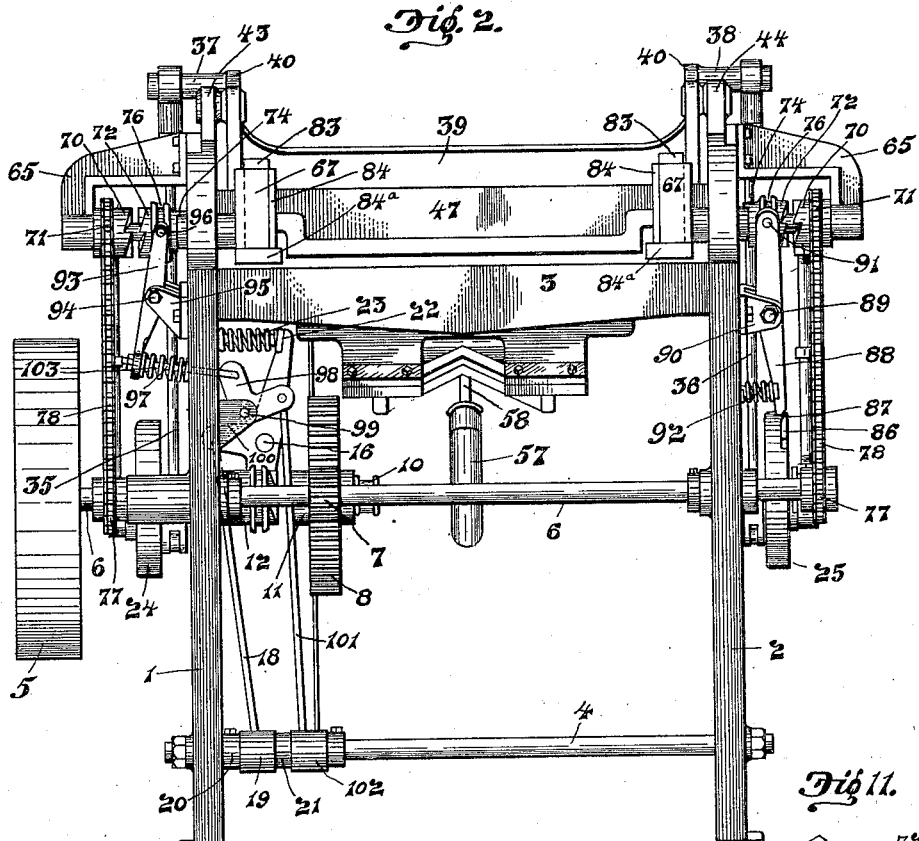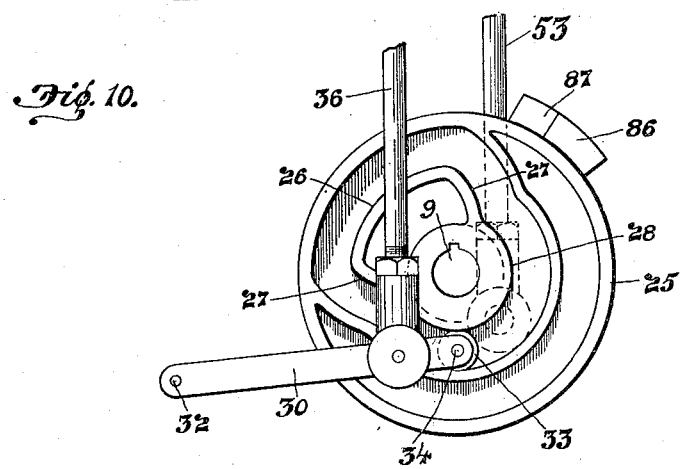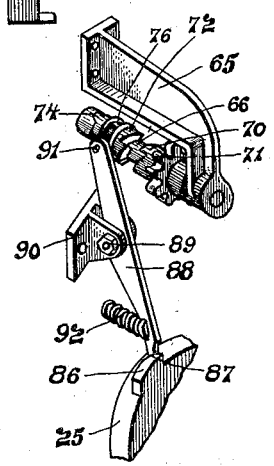

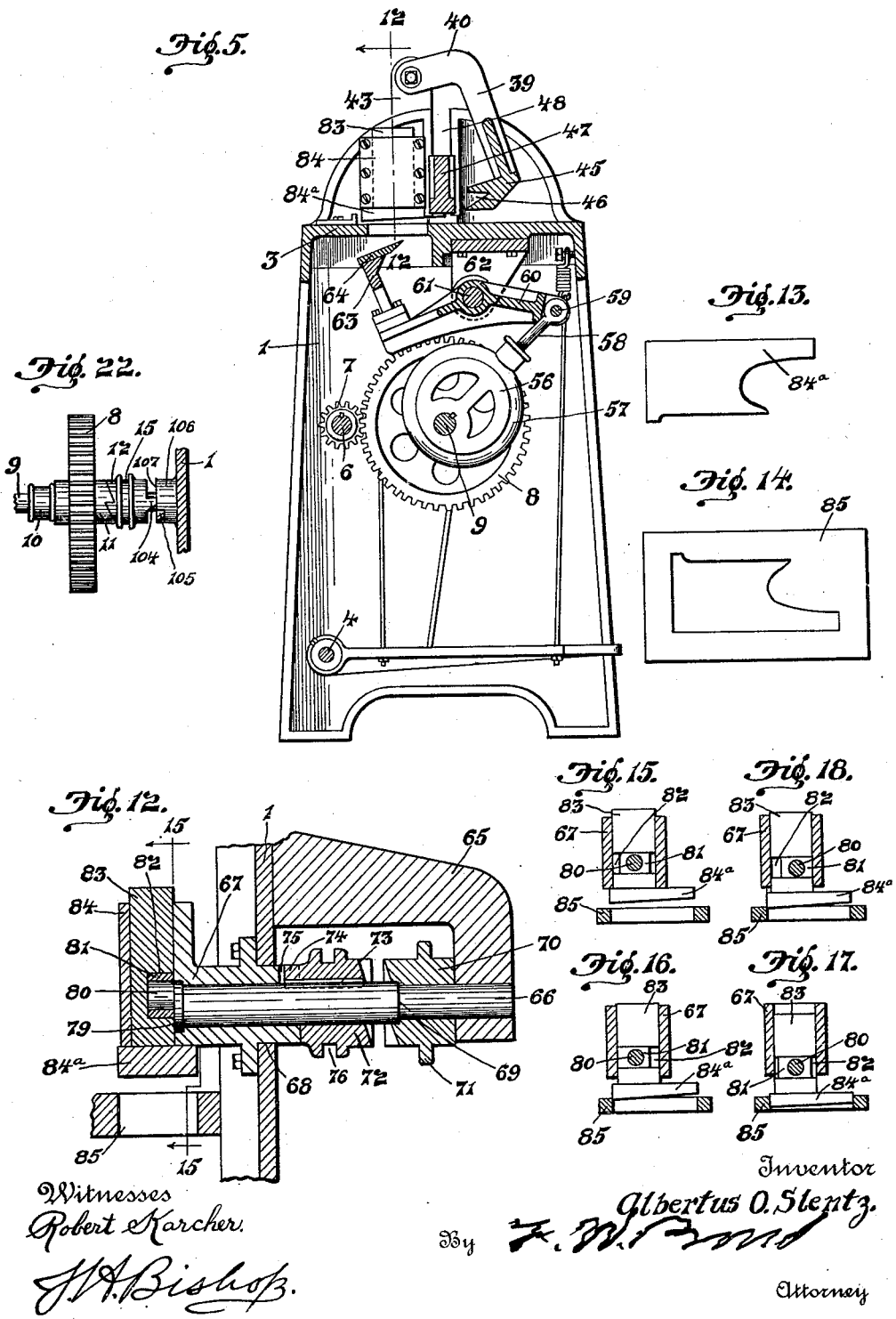

A. O. SLENTZ.
POWER SLIP JOINT FORMING MACHINE.
APPLICATION FILED JULY 17, 1914.

1,121,675.

Patented Dec. 22, 1914.

Witnesses
Robert Karcher
J. H. Bishop

Inventor
Albertus O. Slentz.
By
Attorney

UNITED STATES PATENT OFFICE.

ALBERTUS O. SLENTZ, OF CANTON, OHIO, ASSIGNOR TO THE CANTON FOUNDRY & MACHINE COMPANY, OF CANTON, OHIO, A CORPORATION OF OHIO.

POWER SLIP-JOINT-FORMING MACHINE.

1,121,675. Specification of Letters Patent. Patented Dec. 22, 1914.

Application filed July 17, 1914. Serial No. 851,470.

*To all whom it may concern:*

Be it known that I, ALBERTUS O. SLENTZ, a citizen of the United States, residing at Canton, in the county of Stark and State of Ohio, have invented a new and useful Power Slip-Joint-Forming Machine, of which the following is a specification.

My invention relates to power slip joint forming machines and is designed to form a slip joint upon the ends of sheet metal troughs such as eaves troughs and the like.

The object of the present invention is to provide a machine of the character described in which the slip joint may be formed for either left hand or right hand troughs and in which the cutting and bending of the metal is all accomplished in one continuous operation of the machine.

A further object is to provide such a machine in which means are provided for putting the several movable parts, which accomplish the cutting and bending of the sheet into motion and for automatically stopping said parts at the completion of a single operation.

A further object is to provide such a machine which will form a blank for double beaded eaves trough without removing the sheet from the machine.

With these objects in view the invention consists in the novel construction and arrangement of parts, hereinafter described, illustrated in the accompanying drawings, and particularly pointed out in the appended claims, it being understood that various changes in the form, size and minor details of construction may be made without departing from the spirit or sacrificing any of the advantages of the invention.

Figure 6:
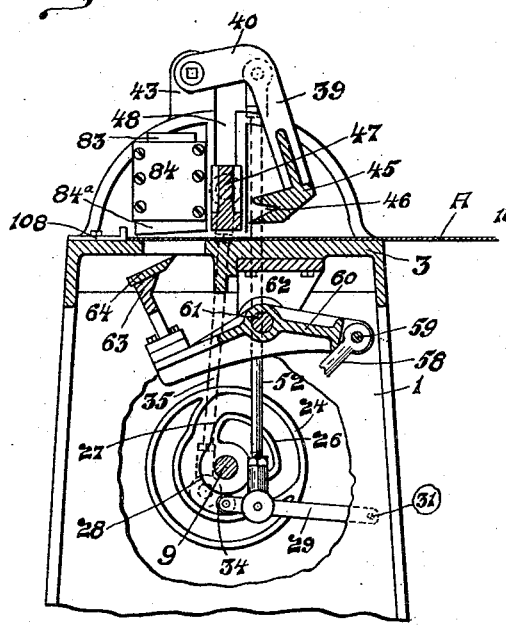
Figure 7:
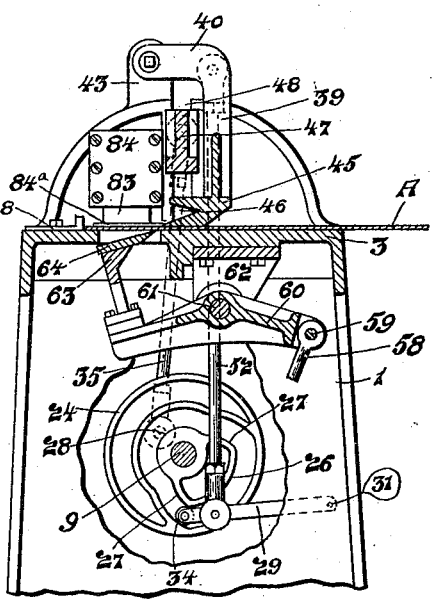
Figure 8:
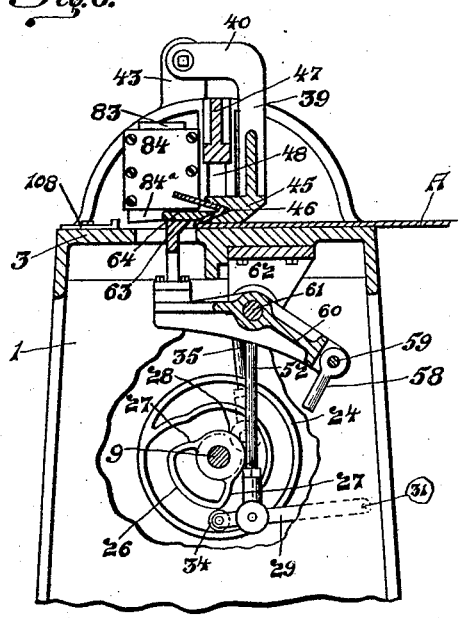
Figure 9:
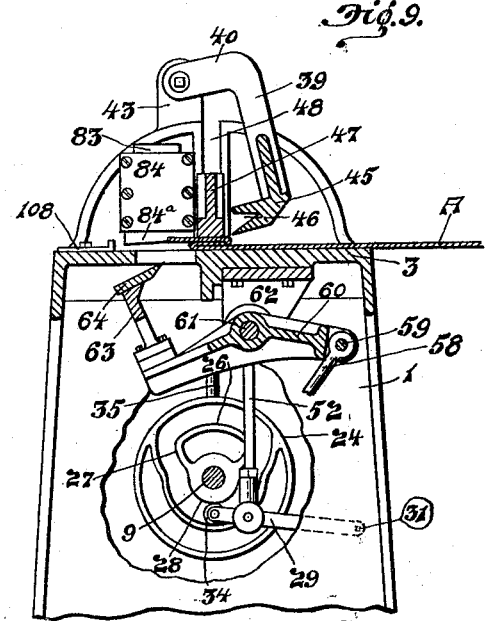

In the accompanying drawings: Figure 1 is a front elevation of my power slip joint forming machine. Fig. 2 is a rear elevation of the same. Fig. 3 is an end elevation of the same. Fig. 4 is a similar view of the opposite end. Fig. 5 is a vertical transverse section taken through my machine on the line 5—5, Fig. 1. Fig. 6 is a transverse vertical section through the machine showing the several movable parts in their initial positions, a sheet of metal being shown in position upon the bed and parts broken away to show the combination cam and pitman wheel which operates the hammer and form. Fig. 7 is a similar view showing the notcher die in its lowered position. Fig. 8 is a similar view showing the metal bent into the form by means of the folder blade. Fig. 9 is a similar view showing the form and folder blade moved out of contact with the sheet and showing the hammer in its lowered position. Fig. 10 is an elevation upon an enlarged scale of one of the combination cam and pitman wheels and the parts operated thereby. Fig. 11 is a perspective view of the clutch which operates the cutting die showing how the same is operated by the cam illustrated in Fig. 10. Fig. 12 is a sectional view through the notcher die and clutch which operates the same. Fig. 13 is a bottom plan view of the notcher die. Fig. 14 is a top plan view of the hollow die into which the notcher die passes. Fig. 15 is a section taken on the line 15—15, Fig. 12, upon a smaller scale, showing the notcher die in the initial position. Fig. 16 is a similar view showing the notcher die as it starts to descend. Fig. 17 is a similar view showing the notcher die in its lowered position. Fig. 18 is a similar view showing the notcher die on its upward stroke. Fig. 19 is a fragmentary view of the end of a sheet showing a slip joint formed by my machine. Fig. 20, is a section on line 20—20, Fig. 19. Fig. 21 is a fragmentary perspective view of a section of guttering formed from the sheet shown in Fig. 19. Fig. 22 is a fragmentary view showing the clutch which controls the operation of the machine.

Similar numerals of reference indicate corresponding parts throughout the several figures of the drawings.

The right and left side frames 1 and 2 respectively support the several movable parts of the machine. The bed 3 is supported between the side frames near their upper extremities and the lower ends of the side frames are tied together and spaced by means of the shaft 4 upon which the operating levers are mounted. The driving pulley 5 is keyed upon the shaft 6, a pinion 7 being also keyed upon said shaft and meshing with a gear wheel 8 which is loosely mounted upon the shaft 9, a collar 10 being tightly mounted upon the shaft 9 by means of a set screw 10ª or its equivalent, said collar preventing the gear wheel 8 from moving laterally upon the shaft 9. A clutch member 11 is formed integral with the gear wheel 8 and is adapted to be engaged by the clutch member 12 which is slidably mounted upon the shaft 9 but is secured against rotation thereon. A bell crank lever 13 is provided with a pin 14, which enters an annular groove 15 formed upon the clutch member 12, said bell crank lever being pivoted at 16 to a bracket 17 and connected by means of a link 18 to a foot 19 which is pivoted upon the shaft 4 and held against lateral movement by means of spacing collars 20 and 21. The bell crank lever 13 is provided with an extension 22 which is engaged by a spring 23 adapted to normally hold the clutch member 12 out of contact with the gear wheel 8.

The right and left combination cam and pitman wheels 24 and 25 respectively are securely mounted upon the shaft 9. Each of these wheels has an interior cam track such as is shown more clearly in Fig. 10 of the drawings, the track consisting of the concentric portion 26 which is connected at either end by means of the portions 27 of the track to a smaller concentric cam face 28. Links 29 and 30 are pivoted upon the right and left end frames respectively at 31 and 32. Each of the links 29 and 30 is provided with a roller 33 pivoted at 34 and located within the cam track upon the wheels 24 and 25, at a point directly beneath the shaft 9. Connecting rods 35 and 36 are pivoted to the links 29 and 30 respectively at a point adjacent the rollers 33, the upper extremities of the connecting rods being pivoted at 37 and 38 respectively to the form 39. The form 39 is provided with the overturned top portion 40 provided with the right and left trunnions 41 and 42 which are mounted in suitable bearings 43 and 44 respectively, provided upon the end frames. An inturned head 45 is located along the lower edge of the form 39 and is provided with a V-shaped groove 46. The hammer 47 is slidably mounted in the grooves 48 and 49 in the end frames 1 and 2 respectively, and is provided with the extensions 50 and 51 to which are pivoted the pitmen rods 52 and 53 respectively, said pitmen rods 52 and 53 being pivotally connected to the pitmen wheels 24 and 25 at 54 and 55, respectively.

The eccentric 56 is keyed upon the shaft 9 and the eccentric band 57 located around the eccentric 56 is provided with a suitable arm 58 which is pivoted at 59 to the lever 60 which carries the folder. The lever 60 is pivotally mounted upon a shaft 61 carried between the brackets 62 which are suspended from the bed of the machine and the folder 63 is secured to the inner extremity of the lever 60 and carries the folder blade 64 which is adapted to press the sheet of metal into the form 39 as will hereinafter be described.

A notcher such as shown in Fig. 12 of the drawings is provided at either end of the bed of the machine and is located in such a position that it will form a notch in the sheet of metal at the proper point. As both of these notchers are identical in their construction and operation it is only thought necessary to describe the construction and operation of one of the devices. A bracket 65 is provided upon the outside of either of the side frames and supports the outer end of the notcher shaft 66, the inner end of said notcher shaft having a bearing within the notcher bearing 67 which is secured to the side frame and is provided with an outward extension located within an aperture 68 within the side frame. The shaft 66 is provided with a shoulder 69 and the loose clutch member 70 is loosely mounted upon the reduced portion of the shaft and is held between the shoulder and the bracket 65, said loose clutch member being provided with a sprocket 71. The fixed clutch member 72 is slidably mounted for lateral movement upon the shaft 66 by means of the feather 73 and is provided with a tooth 74, which engages the notch 75 in the notcher bearing when the notcher is not in operation. When the fixed clutch member 72 is moved laterally upon the shaft bringing the tooth 74 out of engagement with the notch 75 in the notcher bearing the member 72 will engage the member 70, causing the fixed member 72 and the shaft 66 to be rotated with the loose member 70 of the clutch. An annular groove 76 is formed in the fixed member 72 of the clutch the purpose of which will be hereinafter described. A sprocket wheel 77 is mounted upon either end of the shaft 6 and adapted to rotate with said shaft, a sprocket chain 78 connecting each of the sprockets 77 with the sprocket 71 formed upon the loose clutch member 70, thereby, causing the clutch member 70 to be continuously rotated. The shaft 66 is provided upon its inner extremity with a head 79, which carries a wrist pin 80 pivotally mounted within the eccentric block 81, said eccentric block being slidably mounted for a radial reciprocation within the slot 82 located in the shank 83 of the notcher die. A plate 84 is connected to the notcher bearing 67 forming a housing within which the shank 83 of the notcher die reciprocates vertically. The notcher die 84ª is secured in any desired manner upon the lower extremity of the shank 83 and is adapted to pass into the hollow die 85 as shown more clearly in Fig. 17 of the drawings. The only difference between the operation of the two notchers is that the notcher located at the left side of the machine is automatically thrown into operation during the operation of the machine while the one located at the right side of the machine operates independent of the rest of the machine and is thrown into operation by means of a separate foot treadle, which will be later described.

The cam and pitman wheel 25 is provided with a lug 86 having the wedge shaped forward extension 87 adapted to engage the lower extremity of the lever 88 which is pivoted at 89 to a bracket 90 secured to the side frame 2. The upper end of the lever 88 is provided with a pin 91 which engages the annular groove 76 in the clutch member 72. A spring 92 bearing against the lower end of the lever 88 is adapted to normally hold the clutch member 72 out of contact with the member 70.

A lever 93 is pivoted at 94 to a bracket 95 carried by the side frame 1, and said lever is provided at its upper end with a pin 96 located within the annular groove 76 of the clutch member 72 of the right hand notcher. A link 97 connects the lower end of the lever 93 to a bell crank 98 which is pivoted at 99 to a bracket 100 carried upon the inner face of the side frame 1, said bell crank lever being connected by a link 101 to the treadle 102. A spring 103 is interposed between the lower end of the lever 93 and the side frame 1, adapted to normally hold the clutch member 72 out of engagement with the clutch member 70.

The sliding clutch member 12 upon the sliding shaft 9 is provided with a lug 104, which normally lies within the notch 105 located within the boss 106 which is provided upon the inner face of the side frame 1 but when the sliding clutch member 12 is moved into contact with the clutch member 11 upon the gear wheel 8 the lug 104 is brought out of the notch 105 and as the clutch member 12 rotates the lug rides around the face 107 of the boss 106 until it has made one complete revolution when by means of the spring 23 acting upon the bell crank lever 13 the clutch member 12 will be thrown out of engagement with the member 11 upon the gear wheel the lug 104 being reseated within the notch 105 thereby bringing the shaft 9 to a stop.

In operating the machine, a sheet of metal designated by the letter A is placed upon the bed of the machine and against the back gages 108 as shown in Fig. 6 of the drawings. The treadle 19 is then depressed operating the bell crank lever 13, through the medium of the link 18, the pin 14 upon the bell crank lever carrying the slidable clutch member 12 into connection with the clutch member 11 upon the gear wheel 8. As the gear wheel 8 is being constantly rotated by the pinion 7 the clutch member 12 will be caused to rotate and as said clutch member is mounted against rotation upon the shaft 9, the shaft will be caused to rotate also. As soon as the clutch member 12 starts to rotate the lug 104 will be moved out upon the face 107 of the boss 106 out of alinement with the recess 105 and the clutch member 12 and shaft 9 will be allowed to make one complete revolution at the end of which the spring 23 acting upon the extension 22 of the bell crank 13 will throw the clutch member 12 out of contact with the member 11, the lug 104 being reseated within the recess 105 thus bringing the shaft to a stop. When the shaft 9 starts to rotate the beveled face 87 of the lug 86 which is mounted upon the cam and pitman wheel 25 will contact with the lower extremity of the lever 88 throwing the clutch member 72 into engagement with the clutch member 70 thus causing the notcher at the left side of the machine to operate. The clutch upon this notcher operates the same as the clutch upon the shaft 9 and comes to a stop after one complete operation of the notcher has been made. In Fig. 7 of the drawings is shown the position of the several parts of the machine as the notcher die is moved down through the sheet of metal.

While the notcher is being operated as described the pitmen rods upon the cam and pitmen wheels 24 and 25 will raise the hammer into the position shown in Fig. 7 and the links operated by the cam tracks upon said wheels will lower the form into the position shown, and the eccentric 56 upon the shaft 9 will cause the folder blade to move up toward the sheet of metal and as the operation is continued said folder blade will be moved into the position shown in Fig. 8 folding the sheet of metal into the form as shown. A further operation of the eccentric moves the folder blade out of contact with the sheet and the links operated by the cam tracks upon the wheels 24 and 25 will raise the form shown in Figs. 4 and 9, while the pitmen rods will bring the hammer down upon the sheet of metal in the manner shown in this figure. This entire operation takes place during one complete revolution of the shaft 9 and as the revolution of the shaft is completed the clutch member 12 will be brought into its initial position the lug 104 thereon registering with the recess 105 in the boss 106 bringing the shaft to a stop. Where it is desired to form a notch upon the right side of the sheet the independent notcher upon the right side of the machine is operated by means of the treadle 102, the sheet being placed in the right side of the machine and in contact with the right side gage 109 instead of being held against the left side gage 110 as is done when the left hand notcher is used. After the notch has been cut the treadle 19 must then be depressed in order to throw the shaft 9 into operation to complete the bending of the sheet.

The product of this machine is shown in Figs. 19 and 20 of the drawings. The nose B is formed by the notcher and the foldedover portion C which forms the slip joint is shown more clear in Fig. 20 as extended beyond the fold D. It should be noticed that at D and E a slight spring is formed in the metal due to the hammer being of less width than the fold which is made by the folder blade as best illustrated in Fig. 9 of the drawings. The article shown in Figs. 19 and 20 is designed to be afterward formed into a gutter F as shown in Fig. 21, the side adjacent the nose B being formed into a roll G. The slip joint formed by this machine is adapted to receive the plain end of an adjoining section of guttering, the forwardly projecting lip H and the nose B upon the roll G serving to guide the adjoining section of spouting. By means of the spring imparted to the joint from the folds at D and E the end of the adjoining section is thus held firmly in place within the slip joint.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A machine of the character described comprising a bed, a notcher die, a form, a folder blade, a hammer, means for operating said notcher die, a rotatable shaft, cam and pitmen wheels upon said shaft adapted to operate said form and said hammer, an eccentric upon said shaft adapted to operate said folder blade, one revolution of said shaft adapted to complete one operation of the machine, means for rotating said shaft, and means for automatically stopping said shaft at the end of one complete revolution.

2. A machine of the character described comprising a bed, a notcher die, a form, a folder blade, a hammer, means for operating said notcher die, a rotatable shaft, an eccentric upon said shaft adapted to operate said folder blade, cam and pitmen wheels upon said shaft, cam tracks provided upon the inner face of each of said wheels, links connected to said form, rollers carried by said links, said rollers adapted to travel within said cam tracks, wrist pins provided upon the outer faces of said wheels, pitmen rods connected to said wrist pins, said pitmen rods pivotally connected to said hammer, one revolution of said shaft completing one operation of the machine, means for rotating said shaft and means for automatically stopping said shaft at the end of one complete revolution.

3. A machine of the character described comprising a bed, a notcher die, a form, a folder blade, a hammer, a rotatable shaft, an eccentric upon said shaft adapted to operate said folder blade, cam and pitmen wheels upon said shaft, cam tracks provided upon the inner face of each of said wheels, links connected to said form, rollers carried by said links, said rollers adapted to travel in said cam tracks, wrist pins provided upon the outer faces of said wheels, pitmen rods connected to said wrist pins, said pitmen rods pivotally connected to said hammer, a clutch adapted to operate said notcher die, means upon one of said wheels for operating said clutch, one revolution of said shaft completing one operation of said machine, means for rotating said shaft and means for automatically stopping said shaft at the end of one complete revolution.

4. A machine of the character described comprising a bed provided with a slot, a notcher die, a folder blade, a form, a hammer, a rotatable shaft, an eccentric upon said shaft adapted to oscillate said folder blade through said slot and into contact with said form, cam and pitmen wheels upon said shaft, cam tracks provided upon the inner faces of said wheels, links connected to said form, rollers carried by said links, said rollers adapted to travel in said cam tracks, wrist pins upon the outer faces of said wheels, pitmen rods connected to said wrist pins, said pitmen rods pivotally connected to said hammer, a clutch adapted to operate said notcher die, means upon one of said wheels for operating said clutch, one revolution of said shaft completing one operation of said machine, means for rotating said shaft and means for stopping said shaft at the end of one revolution.

5. A machine of the character described comprising end frames, a bed provided with a slot, a notcher die, a form adapted to be oscillated above said bed, a lever, a folder blade carried upon one end of said lever and adapted to be moved through said slot and into engagement with said form, a hammer adapted to be reciprocated above said bed, a rotatable shaft, an eccentric upon said shaft adapted to oscillate said lever, cam and pitmen wheels upon said shaft, cam tracks upon the inner faces of said wheels, links connected to said form, rollers carried by said links, said rollers adapted to travel in said cam tracks, wrist pins upon the outer faces of said wheels, pitmen rods connected to said wrist pins said pitmen rods pivotally connected to said hammer, a clutch adapted to operate said notcher die, means upon one of said wheels for operating said clutch, one revolution of said shaft completing one operation of the machine, means for rotating said shaft and means for stopping the shaft at the end of one revolution.

6. A machine of the character described comprising end frames, a bed provided with a slot, a notcher die, a form adapted to be oscillated above said bed, a lever, a folder blade carried upon one end of said lever, and adapted to be moved through said slot and into engagement with said form, a hammer adapted to be reciprocated above said bed, a rotatable shaft, an eccentric upon said shaft adapted to oscillate said lever, cam and pitmen wheels upon said shaft, cam tracks upon the inner faces of said wheels, links connected to said form, rollers carried by said links said rollers adapted to travel in said cam tracks, wrist pins upon the outer faces of said wheels, pitmen rods connected to said wrist pins said pitmen rods pivotally connected to said hammer, a clutch adapted to operate said notcher die, means upon one of said wheels for operating said clutch, one revolution of said shaft completing one operation of the machine, a clutch for rotating said shaft and means for automatically throwing said clutch out of engagement and stopping said shaft at the end of one revolution.

7. A machine of the character described comprising a bed, a notcher die located at one end of said bed, a form, a folder blade, a hammer, a rotatable shaft, means upon said shaft for operating said notcher die and form and folder blade and hammer, one revolution of said shaft completing one operation of the machine, means for rotating said shaft and means for automatically stopping said shaft at the end of one complete revolution, and a second notcher die located at the opposite end of said bed and means for independently operating said second notcher die.

In testimony that I claim the above, I have hereunto subscribed my name in the presence of two witnesses.

ALBERTUS O. SLENTZ.

Witnesses:
SYLVIA BORON,
F. W. BOND.

Copies of this patent may be obtained for five cents each, by addressing the "Commissioner of Patents, Washington, D. C."